April 27, 1948.  D. E. BARRETT  2,440,243
POULTRY FEEDER
Filed Dec. 11, 1943  2 Sheets-Sheet 1
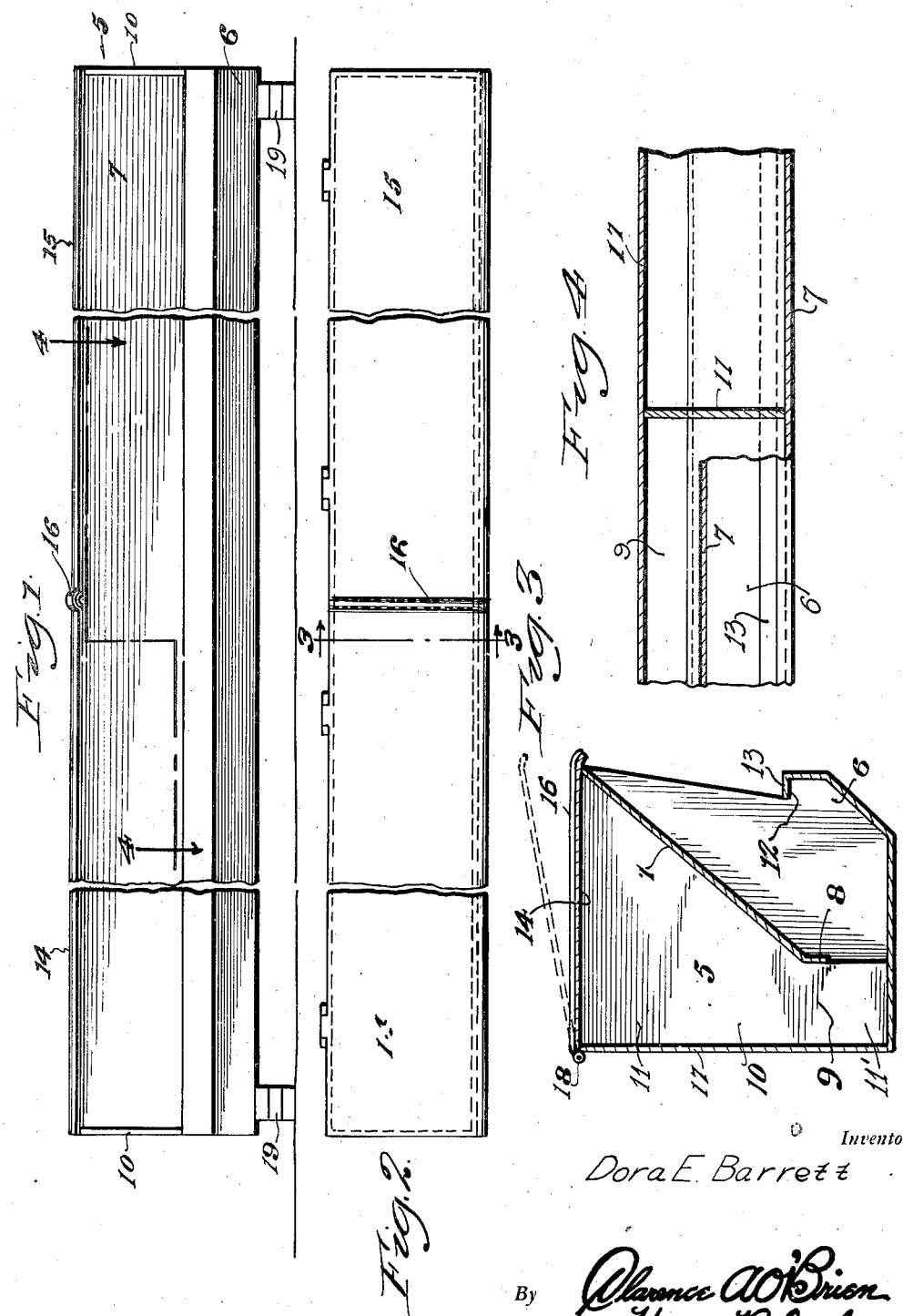
Inventor
Dora E. Barrett
By Clarence A. O'Brien
and Harvey B. Jacobson
Attorneys April 27, 1948.   D. E. BARRETT   2,440,243
POULTRY FEEDER
Filed Dec. 11, 1943   2 Sheets-Sheet 2
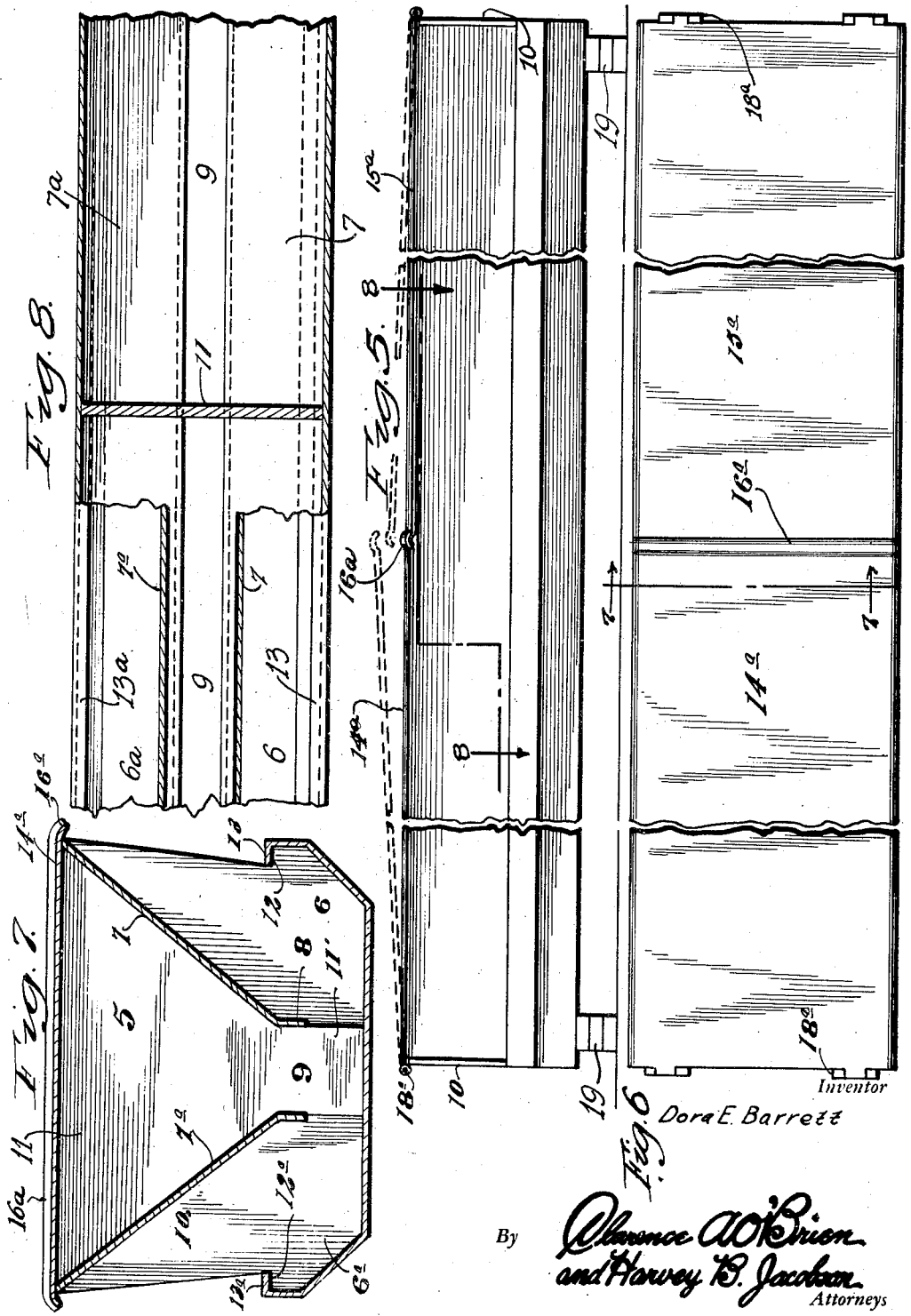
Inventor
Dora E. Barrett
By Clarence A. O'Brien
and Harvey B. Jacobson
Attorneys Patented Apr. 27, 1948

2,440,243

UNITED STATES PATENT OFFICE 2,440,243

POULTRY FEEDER

Dora E. Barrett, El Centro, Calif.

Application December 11, 1943, Serial No. 513,947

1 Claim. (Cl. 119—52)

This invention relates to poultry feeders, and has more particular reference to an improved feeder of the type embodying a feed hopper and a bottom feed trough or pan into which the feed automatically falls by gravity for keeping the feed at the proper level in the bottom trough or pan.

The primary object of the present invention is to provide a poultry feeder of the above type which is simple and durable in construction, inexpensive to manufacture, and efficient in use.

A specific object of the invention is to provide a feeder of the above kind which is relatively long to provide for the simultaneous feeding of a large number of chickens, the hopper of the feeder being divided intermediate its ends by a transverse partition into two compartments, a hinged lid being provided for each compartment, and the lids and partition being cooperatively formed and related so as to afford a weather-tight joint between the adjacent ends of the lids when closed.

The present invention consists in the novel form, combination and arrangement of parts hereinafter more fully described, shown in the accompanying drawings and claimed.

In the drawings, wherein like reference characters indicate corresponding parts throughout the several views:

Figure 1 is a front elevational view, partly broken away, of a single-type of feeder constructed in accordance with the present invention.

Figure 2 is a top plan view thereof.

Figure 3 is a transverse section taken on line 3—3 of Figure 2.

Figure 4 is a fragmentary horizontal section taken on line 4—4 of Figure 1.

Figure 5 is a view similar to Figure 1 of a double-type feeder constructed in accordance with the present invention.

Figure 6 is a top plan view thereof.

Figure 7 is a transverse section taken on the plane of line 7—7 of Figure 6, and Figure 8 is a fragmentary horizontal section taken on line 8—8 of Figure 5.

The present poultry feeder is of horizontally elongated form and constructed to provide a feed hopper 5 and a feeding trough 6 extending the full length of the feeder. The hopper has spaced side walls, at least one of which slopes downwardly toward the other wall, as at 7, and terminates in a vertical lower edge portion 8 to define a restricted outlet, as at 9, at the bottom of the hopper. The feeder has end walls 10 which are common to the hopper and trough, and the hopper is divided into corresponding compartments by means of a transverse partition 11 arranged centrally between the ends of the feeder and having an upper portion arranged in the hopper and formed with a downwardly inclined edge to which the inclined side 7 of the hopper is secured. This partition has a depending lower portion 11' that extends to the bottom of the trough and is provided with a vertical edge to which the vertical lower edge portion 8 of wall 7 is secured. As shown clearly in Figures 3 and 7, the end walls 10 are provided at one side with a horizontal shoulder 12, and the trough 6 has an inturned flange 13 on its side wall extending inwardly on and secured to this shoulder. This flange prevents much of the feed from being thrown out of the trough and wasted on the ground.

Hinged lids 14 and 15 are provided for the hopper, one for each compartment thereof, so that the disadvantages of a single heavy lid of less strength are avoided. The end of one lid adjacent the partition 11 is upwardly offset to fit around the upper edge of said partition, and the adjacent end of the other lid is correspondingly formed to overlap and fit upon the adjacent end of the first-named lid, as generally indicated at 16. This provides a strong sectional lid arrangement in which the lids have an overlapping joint when closed that is of weather-tight construction.

The feeder may be made of the single-type, as shown in Figures 1 to 4, inclusive, in which case the other side wall of the hopper is a flat vertical wall 17 forming the back of the hopper and the trough. In this embodiment, the lids 14 and 15 are preferably hinged, as at 18, to the upper edge of the back wall 17 of the feeder so as to swing upwardly and rearwardly to open position.

The feeder may also be made of double-type, as shown in Figures 5 to 8, inclusive, in which case the other side wall of the hopper is similar to and inclined toward the wall 7, as at 7a, the other side of the trough being formed with a low wall having an inturned flange 13a at the top thereof engaging and secured to a second shoulder 12a formed on the vertical edges of the end walls 10 at this side of the feeder. Thus, a trough portion is provided at both sides of the feeder from which the fowl may take feed, the second trough being indicated at 6a. In this embodiment, the lids 14a and 15a are preferably hinged at their outer ends to the end walls of the feeder, as at 18a, and the inner ends of the lids are cooperatively formed and related with the upper edge of the partition 11a, as at 16a, to form a weather-tight joint when the lids are closed, similar to that described in connection with the embodiment of Figures 1 to 4, inclusive.

The feeder proper is preferably mounted at an elevation above the ground by placing the same upon a series of superimposed blocks or bars 19 extending transversely of the feeder near opposite ends thereof. By varying the number of bars or blocks used at each end of the feeder, the height of the latter from the ground may be regulated to suit the requirements of chickens of various sizes.

In use, the lids of the hopper are opened, and dry feed is placed in the hopper compartments. This feed falls by gravity into the trough or troughs 6 or 6a until it reaches a level therein slightly above the bottom of the hopper and below the top of the trough or troughs. As the feed is eaten from the trough or troughs, the supply in the latter is automatically replenished by falling of the feed by gravity from the hopper into the trough or troughs.

From the foregoing description, it is believed that the construction and operation, as well as the advantages, of the present invention will be readily understood and appreciated by those skilled in the art.

What I claim as new is:

A poultry feeder comprising a feeding trough having side walls, at least one of said side walls being provided on its upper edge with an inturned flange, a feed hopper for the trough having spaced side walls, at least one of said side hopper walls sloping downwardly toward the other and from the flanged wall of the trough and terminating in a vertical lower edge portion, said feeder having end walls common to the hopper and the trough, said end walls extending beyond the sloping side wall of the hopper and being provided with shoulders, the ends of said inturned flange extending inwardly upon and being secured to said shoulders, a transverse partition dividing the hopper into compartments and having a sloping edge and provided with a depending lower portion that extends to the bottom of the trough, the upper portion of the sloping wall of the hopper and its vertical lower edge portion being respectively secured to the sloping edge and to the edge of the depending lower portion of the partition.

DORA E. BARRETT.

REFERENCES CITED

The following references are of record in the file of this patent:

UNITED STATES PATENTS

| Number | Name | Date |
|---|---|---|
| 343,386 | McDonald | June 8, 1886 |
| 1,125,044 | Beane | Jan. 19, 1915 |
| 1,415,376 | McCollough | May 29, 1922 |
| 1,630,862 | Parks | May 31, 1927 |
| 1,815,512 | Kopetka | July 21, 1931 |
| 1,890,778 | German | Dec. 13, 1932 |
| 1,930,184 | Rutherford | Oct. 10, 1933 |
| 2,210,108 | Wardell | Aug. 6, 1940 |

FOREIGN PATENTS

| Number | Country | Date |
|---|---|---|
| 108,161 | Australia | Oct. 5, 1939 |